United States Patent [19]

Sniezek et al.

[11] 4,238,956
[45] Dec. 16, 1980

[54] RADIATION ATTENUATION WEIGHING SYSTEM FOR A VERTICAL MATERIAL FEEDER

[75] Inventors: Joseph T. Sniezek, Keewatin, Canada; Paul W. Chase, Anoka, Minn.; Wendell D. Miller, Austin, Tex.

[73] Assignee: Ramsey Engineering Company, St. Paul, Minn.

[21] Appl. No.: 934,737

[22] Filed: Aug. 21, 1978

[51] Int. Cl.² .................. G01F 1/00; G01F 1/66; G01N 9/24
[52] U.S. Cl. .................................................. 73/861.01
[58] Field of Search .................. 73/194 E, 194 M; 250/359, 392

[56] References Cited

U.S. PATENT DOCUMENTS

| | | | |
|---|---|---|---|
| 3,604,928 | 9/1971 | Starnes | 250/359 |
| 4,044,259 | 8/1977 | Wytor | 250/359 X |

Primary Examiner—Donald Watkins
Attorney, Agent, or Firm—William C. Norvell, Jr.

[57] ABSTRACT

A weighing apparatus for a vertical material feeder which feeds particulate material from a storage bin through a prefeeder agitator and a feeder bowl to an outlet pipe. The weighing apparatus includes a radiation source and detection means positioned on opposite sides of the path of travel of the material through the feeder bowl for generating a signal representing the mass of material in the path. The weighing apparatus also includes a speed sensor for generating a signal representing the speed of the material through the feeder bowl and means responsive to the mass signal and the speed signal for generating a signal representing the rate at which the material is being fed through the feeder bowl.

15 Claims, 3 Drawing Figures

RADIATION ATTENUATION WEIGHING SYSTEM FOR A VERTICAL MATERIAL FEEDER

BACKGROUND OF THE INVENTION

1. Field of the Invention

The present invention relates in general to weighing systems utilizing the attenuation of radiation by the material being weighed and in particular to such a weighing system in an apparatus for feeding dry, free-flowing material of small particle size.

2. Description of the Prior Art

The prior art vertical material feeder includes a first member having an agitator and valve means rotating about an upright axis to provide a valving action for discharging material from a storage bin and a second member for receiving the material as it discharges from the first member including means to weigh the material. A signal representing the speed of movement of the feeding apparatus is combined with a signal representing the weight of the material in the second member to generate a signal representing the rate of discharge of the material from the bin. The rate signal is utilized for determining whether a correct amount of material is being fed and control means are provided for making adjustments to the rate of feed. The weighing means is pivotally mounted and supported by a compression type weight sensor which generates the weight signal. The weight and speed signals are the inputs to a multiplier and totalizer which generates rate and totalized throughput signals.

SUMMARY OF THE INVENTION

The present invention concerns an apparatus for weighing particulate material being fed through a vertical material feeder. The material is discharged from a storage bin to a feeder bowl by a prefeeder agitator. Both the prefeeder agitator and the feeder bowl have a multivaned rotor driven by a drive motor for moving the material along a path of travel through the material feeder. A tachometer mechanically coupled to the drive motor generates a signal representing the speed at which the material is moving along the path. A multiple point source of radiation positioned above the path of travel through the feeder bowl and an ion chamber below the feeder bowl cooperate to generate a signal representing the mass of material in the feeder bowl. Since the mass signal decreases as the mass increases, the mass signal is applied to an amplifier having a bridge circuit which is nulled when the mass signal is at a maximum, i.e. the feeder bowl is empty. As the mass signal decreases, the bridge circuit becomes more unbalanced and the amplifier output signal increases. The amplifier output signal is non-linear and is linearized before being multiplied with the speed signal to generate a signal representing the rate of flow of material through the vertical material feeder.

It is an object of the present invention to increase the reliability of material weighing in a vertical material feeder.

It is another object of the present invention to reduce the complexity of a vertical material feeder.

DESCRIPTION OF THE PREFERRED EMBODIMENT

Figure 1:
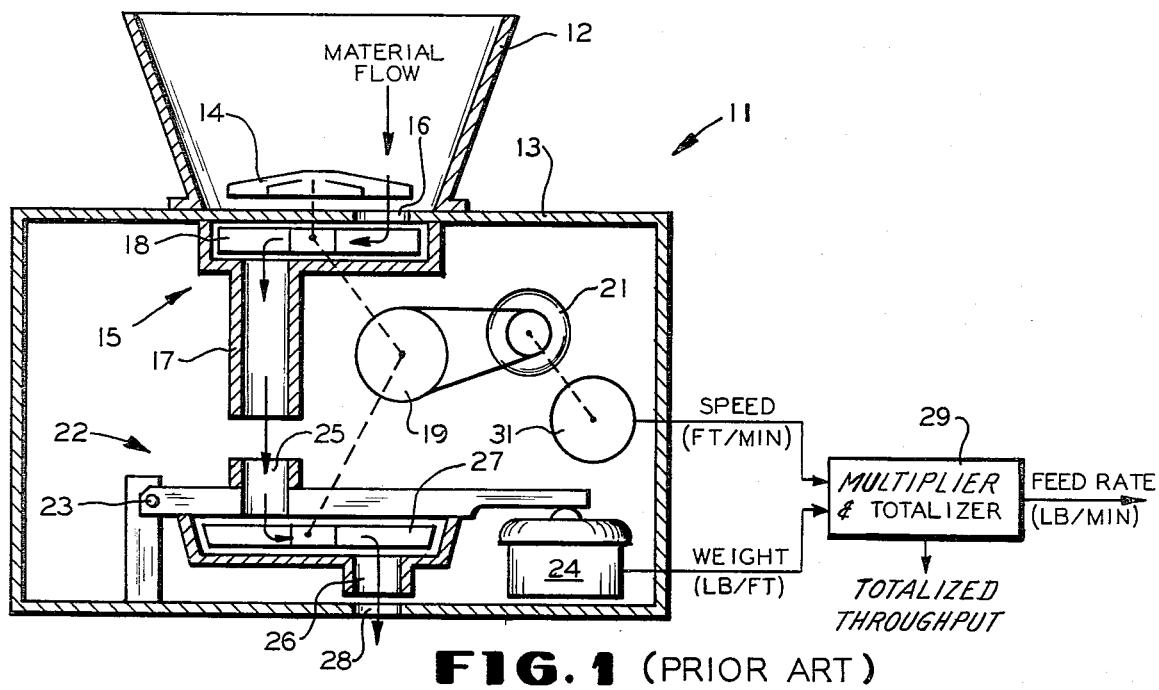
FIG. 1 is a schematic diagram of the prior art vertical material feeding apparatus.

There is shown in FIG. 1 a schematic diagram of vertical material feeding apparatus 11 according to the prior art including a material weighing system. The material to be fed (not shown), typically a dry free-flowing material of small particle size, is loaded into a bin 12 attached to the upper surface of an enclosure 13 for the material feeding components. A multivaned agitator rotor 14 is rotated in the bottom of the bin 12 to prevent bridging or material build up and to sweep the material into a prefeeder 15 through an inlet opening 16 in the enclosure 13. The material flow path through the feeding apparatus is shown as a series of arrows.

The prefeeder 15 functions to isolate the weight of the material in the bin from the weighing system, condition the material into a uniform, fluidized state, and to continuously transfer material into the feeding apparatus. Material enters the prefeeder 15 through the inlet opening 16 and is swept through 180° of rotation to a discharge pipe 17 by a multivaned rotor 18. The rotors 14 and 18 are mechanically coupled to a drive shaft of a gear box 19 which, typically, is belt driven by a direct current motor 21. As the rotor 18 is rotated, the one half of the volume swept by the rotor vanes from the inlet opening 16 to the discharge pipe 17 is full of material and the one half of the volume swept from the discharge pipe 17 to the inlet opening 16 is empty.

A weigher-feeder 22 is pivotally mounted on one side thereof to the enclosure 13 at 23 and is supported on the other side thereof by a weight sensor 24. The material from the discharge pipe 17 enters the weigher-feeder through an inlet port 25 and is swept to an outlet port 26 by a multivaned rotor 27. The ports 25 and 26 are positioned such that the material is swept through a rotation of substantially more than 180° so that a large amount of material will be in the weigher-feeder 22 causing the weight signal from the sensor 24 to be high in relation to the "no-load" signal in order to increase the accuracy of the weight signal. The material is then discharged from the enclosure 13 through an outlet opening 28. Typically, the weigher-feeder 22 has the ports 25 and 26 coupled to the discharge pipe 17 and the outlet opening 28 by soft, rubber-like sleeves (not shown) to avoid coupling forces into the weigher-feeder.

The weight sensor 24 is a compression type device which generates a signal (LB/FT) representing the weight of the material in the weigher-feeder 22. The weight signal is an input to an integrator totalizer 29. Another input to the integrator totalizer is a speed signal (FT/MIN) which is proportional to the rotational speed of the rotors 18 and 27. The speed signal is generated by a speed sensor 31 which typically is a tachometer mechanically coupled to the drive shaft of the motor 21. The multiplier and totalizer 29 multiplies the two input signals to generate an output signal (LB/MIN) representing the feed rate of the material and a totalized throughput signal. Although not shown, the feed rate signal can then be utilized as a feedback signal to control the motor speed at a desired feed rate. The above-described material feeding apparatus is disclosed in U.S. Pat. No. 3,561,643 issued Feb. 9, 1971 to G. P. Kloven.

Figure 2:
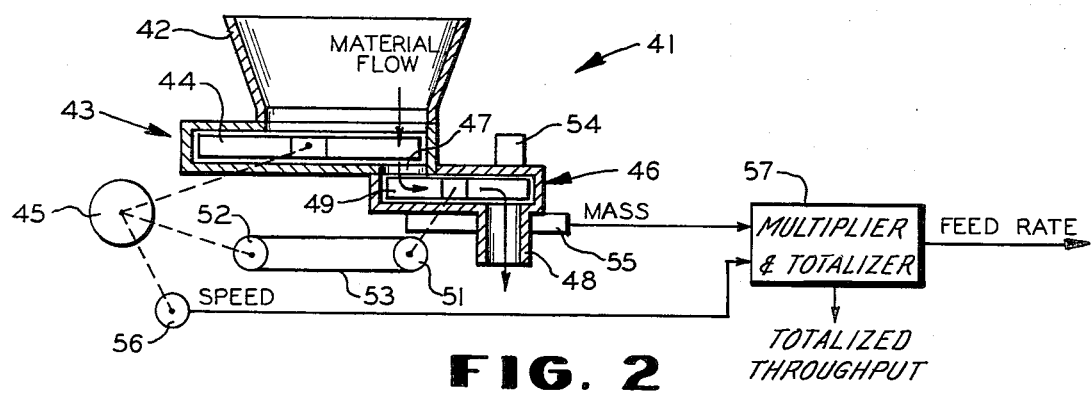
FIG. 2 is a schematic diagram of a vertical material feeding apparatus according to the present invention.

There is shown in FIG. 2 a vertical material feeding apparatus 41 according to the present invention. The material to be fed (not shown) is loaded into a storage bin 42 attached to the upper surface of a prefeeder agitator 43. The bottom of the bin 42 is open to the agitator 43 which includes a multivaned agitator rotor 44. The rotor 44 is mechanically coupled to a drive motor 45 which drives the rotor to agitate the bin material and prevent bridging and to sweep the material into a feeder bowl 66 through an outlet opening 47. Material which enters the feeder bowl 46 is swept through a mass detection station to a discharge pipe 48. The material flow path through the feeding apparatus is shown as a series of arrows.

The feeder bowl 46 includes a multivaned rotor 49 which is mechanically coupled to a pulley 51 driven from another pulley 52 by a belt 53. The pulley 52 is mechanically coupled to the drive motor 45. The motor 45 rotates the rotor 49 to sweep the material from the outlet opening to the discharge pipe 48. The mass detection station includes a source of radiation 54, typically gamma rays, and a detector such as an ion detector 55. Attenuation of the radiation from the source 54 by the material is sensed by the detector 55 which generates a signal representing the mass of the material in the feeder bowl 46. A speed sensor 56, such as a tachometer, is mechanically coupled to the drive motor 45 to generate a signal representing the speed of the rotor 49. As will be explained below, the mass and speed signals are utilized in a feed rate circuit 57 to determine the rate at which the material is being fed through the feeding apparatus 41.

Figure 3:
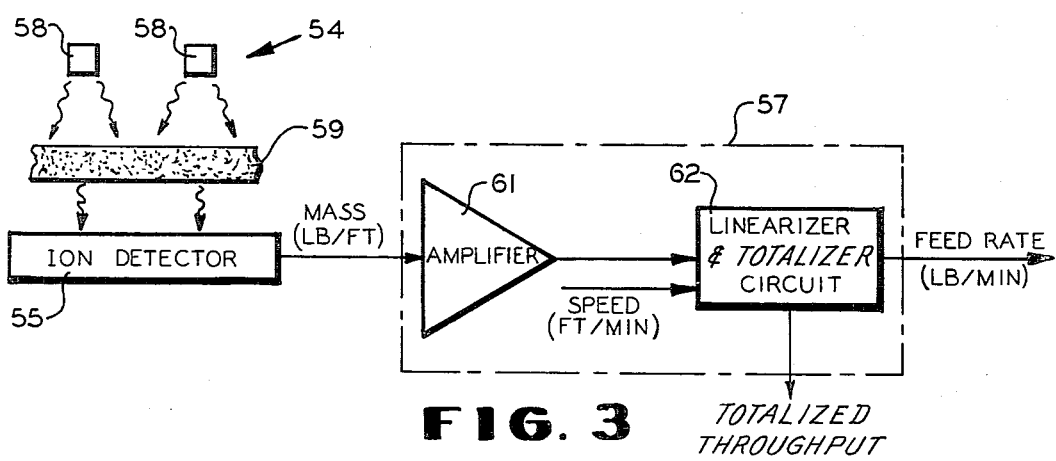
FIG. 3 is a schematic diagram of the material feed rate circuit utilized in the apparatus of FIG. 2.

There is shown in FIG. 3 a schematic diagram of the material feed rate circuit 57 of FIG. 2. Typically, the radiation source 54 can be a pair of point sources 58 of gamma rays positioned above the feeder bowl for uniform illumination of the top surface of the material 59 in the segments between the vanes of the rotor 49. The use of two sources reduces the effect of fluctuations in the height of the material and the attenuation caused by the rotor vanes. In the alternative, a strip source of radiation could be utilized. Such a strip source is disclosed in U.S. Pat. No. 2,964,628. The ion detector 55 can be a gas filled ion chamber or other radiation sensitive device. As gamma rays from the radiation source 54 strike the gas molecules inside the chamber, some of the molecules are ionized. The resulting positive ions are attracted to the negative electrode of the chamber and the negative ions are attracted to the positive electrode of the chamber thus creating a current in the chamber which is proportional to the amount of radiation striking the gas in the chamber.

The beams of radiation from the two sources 58 pass through the material and are detected by the ion detector 55. Some of the radiation is either absorbed or scattered by the material thus preventing its detection. For any particular path through the material, the attenuation of the radiation is a function of the density (lbs/cu ft) and the thickness (ft) of the material. Thus, the attenuation is a function of mass per unit area (lb/sq ft) and, when detected over the radial width of the rotor segments (ft), the output signal from the ion detector 55 represents the loading of the feeder bowl 46 in LB/FT of material.

The signal from the ion detector 55 is an input to an amplifier 61 in the feed rate circuit 57. When the feeder bowl is empty, the output signal from the ion detector will be at a maximum. The amplifier includes a bridge circuit (not shown) which nulls at the maximum detector signal to generate a minimum output signal. With material in the feeder bowl, the input signal to the amplifier decreases and the bridge circuit becomes unbalanced which increases the amplifier output signal. Due to the absorption characteristics of radiation, the output signal from the amplifier will be a non-linear representation of the feeder bowl loading. This signal is fed to a linearizer-multiplier circuit 62 which linearizes the feeder bowl loading signal. A second input to the circuit 62 is the speed signal (FT/MIN) from the speed sensor 56 of FIG. 2. The circuit 62 converts the speed signal to the velocity at the center of the material in the segments defined by the rotor vanes and multiplies the two signals together to generate a feed rate signal (LB/MIN).

In summary, the present invention concerns an apparatus for weighing particulate material being fed through a vertical material feeder. The feeder includes a storage bin from which the material is fed, a prefeeder agitator for discharging the material from the bin, a feeder bowl for receiving the material from the prefeeder agitator and discharging the material from the vertical material feeder. The weighing apparatus includes a source of radiation positioned on one side of the path of travel of the material through the feeder bowl; a radiation detection means positioned on the side of the path of travel opposite the radiation source, the detection means being responsive to the radiation received from the radiation source through the material for generating a signal representing the mass of the material in the path between the radiation source and the detection means; means for generating a signal representing the speed at which the material is moving along the path; and means responsive to the mass signal and the speed signal for generating a signal representing the rate at which the material is being fed through the vertical material feeder.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed and desired to be secured by Letters Patent is:

1. An apparatus for weighing particulate material being fed through a vertical material feeder, the feeder including a storage bin from which the material is fed, a prefeeder agitator for discharging the material from the bin, a feeder bowl for receiving the material from the prefeeder agitator and discharging the material from the vertical material feeder, the weighing apparatus comprising:

a source of radiation positioned on one side of the path of travel of the material through the feeder bowl;

a radiation detection means positioned on the side of said path of travel opposite said radiation source, said detection means being responsive to the radiation received from said radiation source through the material for generating a signal representing the mass of the material in said path between said radiation source and said detection means;

means for generating a signal representing the speed at which the material is moving along said path; and means responsive to said mass signal and said speed signal for generating a signal representing the rate at which the material is being fed through the vertical material feeder.

2. A weighing apparatus according to claim 1 wherein said radiation source is a point source.

3. A weighing apparatus according to claim 2 wherein said point source is a multiple point source.

4. A weighing apparatus according to claim 1 wherein said radiation source is a strip source.

5. A weighing apparatus according to claim 1 wherein said radiation detection means is an ion chamber.

6. A weighing apparatus according to claim 1 wherein said radiation detection means is a G.M. counter.

7. A weighing apparatus according to claim 1 wherein said radiation detection means is a scintillation counter.

8. A weighing apparatus according to claim 1 wherein said radiation detection means is a proportional counter.

9. A weighing system according to claim 1 wherein the vertical material feeder includes drive means and a multivaned rotor in the feeder bowl driven by said drive means for moving the material through the feeder bowl and wherein said speed signal generating means includes a tachometer mechanically coupled to said drive means for generating said speed signal.

10. A weighing system according to claim 1 wherein said radiation detection means decreases said mass signal as the mass of the material in said path increases and wherein said rate signal generating means includes means responsive to said mass signal for generating an output signal which increases as the mass of the material in said path increases and means responsive to said output signal and said speed signal for generating said rate signal.

11. A weighing system according to claim 10 wherein said output signal generating means includes an amplifier having a bridge circuit which is nulled when said mass signal is at a maximum and becomes unbalanced to generate said output signal as said mass signal decreases.

12. A weighing system according to claim 10 wherein said output signal is non-linear and said output signal responsive means includes a linearizer-multiplier circuit which linearizes said output signal and multiplies said linearized output signal with said speed signal to generate said rate signal.

13. An apparatus for weighing particulate material being fed through a vertical material feeder, the feeder including a storage bin from which the material is fed, a prefeeder agitator including a multivaned rotor for discharging the material from the bin, a feeder bowl for receiving the material from the prefeeder agitator and having a multivaned rotor for discharging the material from the vertical material feeder, and drive means for rotating the prefeeder agitator rotor and the feeder bowl rotor, the weighing apparatus comprising:
a source of radiation positioned on one side of the feeder bowl rotor;
a radiation detection means positioned on the other side of the feeder bowl rotor, said detection means being responsive to the radiation emitted by said radiation source for generating a signal inversely related to the mass of material in the feeder bowl;
speed sensor means coupled to the drive means for generating a signal representing the speed at which the material is being fed through the feeder bowl;
amplifier means responsive to said mass signal for generating an output signal which is proportional to the mass of material in the feeder bowl; and
means responsive to said amplifier output signal and said speed signal for generating a signal representing the rate at which the material is being fed through the vertical material feeder.

14. A weighing apparatus according to claim 13 wherein said radiation source is a multiple point source and said detection means is an ion chamber.

15. A weighing apparatus according to claim 13 wherein said amplifier means generates a non-linear output signal and said rate signal generating means includes a linearizer-multiplier circuit for linearizing said output signal and multiplying said linearized output signal with said speed signal to generate said rate signal.

* * * * *